US010256997B2

(12) United States Patent
Dogan et al.

(10) Patent No.: US 10,256,997 B2
(45) Date of Patent: Apr. 9, 2019

(54) COMPUTING TRANSMIT AND RECEIVE FILTERS FOR A NETWORK DEVICE

(71) Applicant: Cisco Technology, Inc., San Jose, CA (US)

(72) Inventors: Mithat C. Dogan, San Jose, CA (US); Brian D. Hart, Sunnyvale, CA (US); Jiunming Huang, San Jose, CA (US); Matthew Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 52 days.

(21) Appl. No.: 15/381,630

(22) Filed: Dec. 16, 2016

(65) Prior Publication Data

US 2018/0176044 A1 Jun. 21, 2018

(51) Int. Cl.
*H04L 25/02* (2006.01)
*H04L 25/03* (2006.01)
*H04B 7/0413* (2017.01)
*H04W 84/12* (2009.01)
*H04W 88/12* (2009.01)

(52) U.S. Cl.
CPC ....... *H04L 25/0246* (2013.01); *H04B 7/0413* (2013.01); *H04L 25/0204* (2013.01); *H04L 25/0244* (2013.01); *H04L 25/03159* (2013.01); *H04W 84/12* (2013.01); *H04W 88/12* (2013.01)

(58) Field of Classification Search
CPC ................................................ H04L 25/0246
See application file for complete search history.

(56) References Cited

U.S. PATENT DOCUMENTS

| | | | | |
|---|---|---|---|---|
| 2007/0160159 | A1* | 7/2007 | Song | H04L 25/0232 375/260 |
| 2009/0010149 | A1* | 1/2009 | Lee | H04B 7/068 370/208 |
| 2012/0076214 | A1* | 3/2012 | Wei | H04L 25/0204 375/259 |
| 2016/0087769 | A1* | 3/2016 | Wild | H04B 7/065 370/329 |
| 2017/0288750 | A1* | 10/2017 | Qian | H04B 7/0456 |
| 2017/0288751 | A1* | 10/2017 | Faxer | H04B 7/0456 |
| 2017/0338876 | A1* | 11/2017 | Moosavi | H04B 7/0626 |

OTHER PUBLICATIONS

Adi Ben-Israel and Dan Cohen, "On Iterative Computation of Generalized Inverses and Associated Projections", SIAM Journal of Numerical Analysis, vol. 3, No. 3, pp. 410-419, 1966.
Quentin H. Spencer, A. Lee Swindlehurt, and Martin Haardt, "Zero-Forcing Methods for Downlink Spatial Multiplexing in Multiuser MIMO Channels," IEEE Transactions on Signal Processing, vol. 55, No. 2, Feb. 2004.

* cited by examiner

*Primary Examiner* — Jason E Mattis
(74) *Attorney, Agent, or Firm* — Patterson + Sheridan, LLP

(57) ABSTRACT

The embodiments herein use a factorization based technique for determining filter coefficients for a subset of the subcarriers in a wireless frequency band. Once the filter coefficients for the subset of the subcarriers are calculated, the network device uses these filter coefficients to identify the filter coefficients in a neighboring subcarrier. To do so, the network device uses pseudo-inverse iteration to convert the already calculated filter coefficients into filter coefficients for a neighboring subcarrier. The network device can repeat this process for the next set of neighboring subcarriers until all the filter coefficients have been calculated.

12 Claims, 5 Drawing Sheets

US 10,256,997 B2

COMPUTING TRANSMIT AND RECEIVE FILTERS FOR A NETWORK DEVICE

TECHNICAL FIELD

Embodiments presented in this disclosure generally relate to generating MIMO filters for network devices.

BACKGROUND

Multiple-input and multiple-output (MIMO) technologies are used in access points that have multiple antennas to detect wireless signals and aggregate multiple output connections. Multi-user MIMO (MU-MIMO) is a wireless MIMO technique where one device sends different data to multiple other devices at the same time. The success of an MU-MIMO transmission depends on the precoding done at the transmitter and filtering at the receiver which is standardized in IEEE 802.11ac. Linear MIMO receivers and transmitters perform complicated calculations to generate receive and transmit filters for each subcarrier (i.e., different smaller frequency ranges that collectively define a single frequency band) using channel state information and noise variance estimates. Linear filter design falls into two categories—zero-forcing (ZF) and minimum mean-squared error (MMSE)—both of which require inversion of a Hermitian symmetric covariance matrix R obtained by channel matrix products (H*H) for each subcarrier in an orthogonal frequency-division multiplexing (OFDM) based communication system—e.g., Wi-Fi and LTE.

Current solutions for calculating the transmit and receive filters compute the required filter coefficients by a factorization of R, followed by double back-substitution for desired filter coefficients. Calculating the filters for each of the subcarriers is complicated and requires a substantial amount of time. Generating accurate filter coefficients requires expensive processing systems and can delay communications between network devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
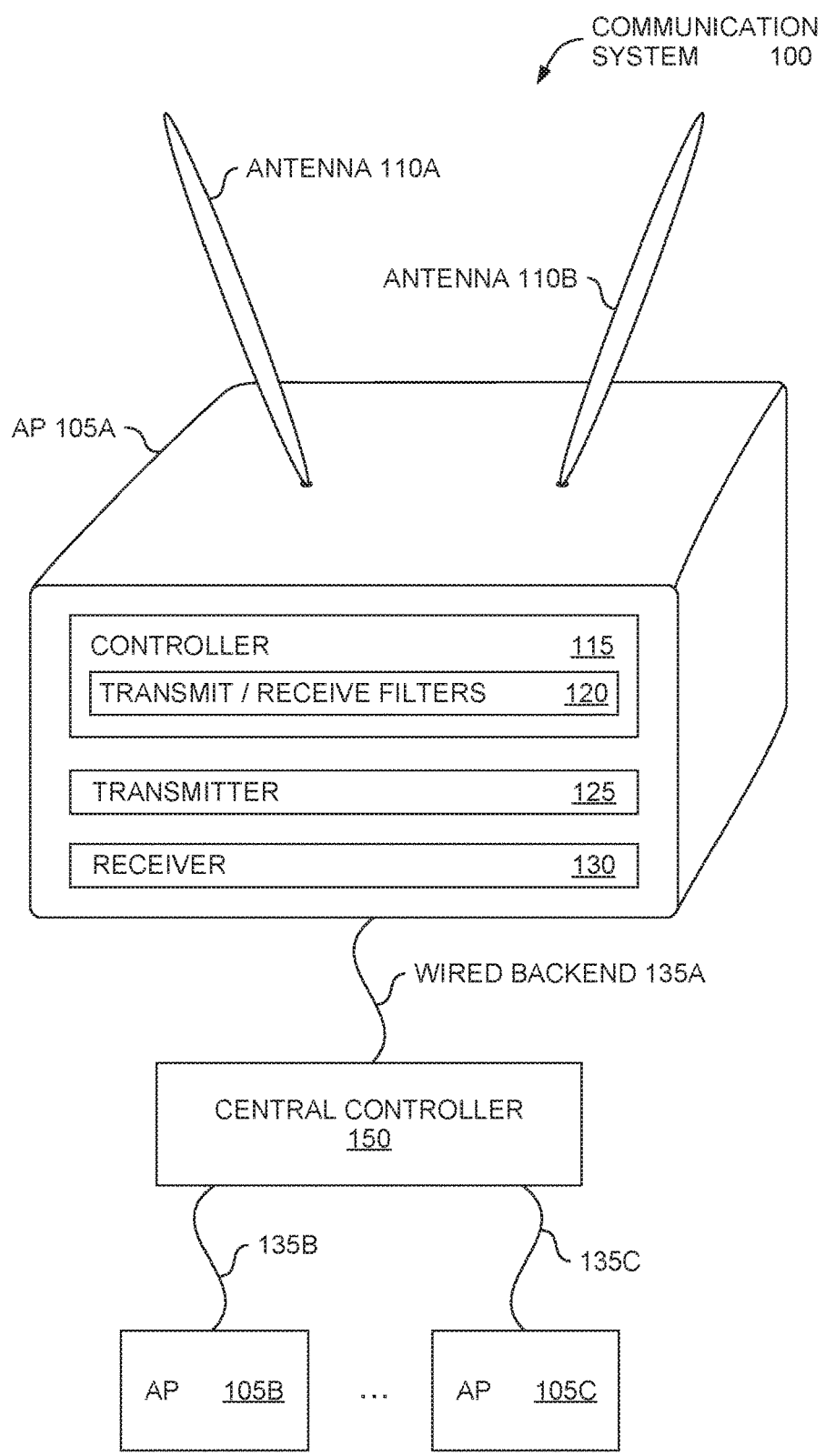
FIG. 1 illustrates a communication system that uses MIMO communication, according to one embodiment described herein.

One embodiment presented in this disclosure is a controller for a network device. The controller includes a processor and a memory including computer readable program code configured to perform an operation when executed by the processor. The operation includes determining, using a factorization based technique, first filter coefficients for a first subcarrier in a wireless frequency band and determining second filter coefficients for a second subcarrier in the wireless frequency band based on the first filter coefficients and a pseudo-inverse technique, where the first and second coefficients are configured to filter data signals communicated with respect to the network device.

Another embodiment presented in this disclosure is a method that includes determining, using a factorization based technique performed by a network controller, first filter coefficients for a first subcarrier in a wireless frequency band and determining, using the network controller, second filter coefficients for a second subcarrier in the wireless frequency band based on the first filter coefficients and a pseudo-inverse technique, where the first and second coefficients are used to filter data signals communicated with respect to a network device.

A network device that includes a plurality of antennas coupled to a transmitter and receiver and a network controller. The network controller is configured to determine channel state information based on signals received by at least one of the plurality of antennas, determine first filter coefficients for a first subcarrier in a wireless frequency band based on the channel state information, and determine second filter coefficients for a second subcarrier in the wireless frequency band based on the first filter coefficients and a pseudo-inverse technique, wherein the first and second coefficients are configured to filter data signals communicated with respect to the network device.

Example Embodiments

The present embodiments describe techniques for calculating filter coefficients for a plurality of subcarriers in a frequency band. For example, 802.11, LTE, and other communication techniques divide a frequency band into different subcarriers (i.e., different smaller frequency ranges) which can be used by a network device to transmit data. As described above, a network device may calculate respective transmit and receive filters for each of the subcarriers. To do so, the network device calculates respective filter coefficients which are tailored for a specific communication channel representing the propagation environment between receiving and transmitting devices using a particular subcarrier to communicate.

Current techniques compute the filter coefficients by factorizing the R matrix followed by double back-substitution. However, these techniques solve each subcarrier separately even when the matrix of channel responses (i.e., the channel state information) does not vary across subcarriers. Put differently, current techniques ignore the similarity across subcarriers which means these techniques suffer from increased computation requirements and often use approximations that incur a performance penalty so that the time required to calculate the filter coefficients does not impede communications.

The embodiments herein take advantage of the high correlation of the propagation channel across subcarriers within the coherence bandwidth to decrease computations without incurring performance penalties. This strategy becomes more advantageous when using communication systems with a large number of subcarriers such as IEEE 802.11ax where the subcarriers spacing is four times less than the spacing in IEEE 802.11ac. In one embodiment, the network device uses factorization to compute the filter coefficients for a subset of the subcarriers. For example, the network device may use factorization such as LDL decomposition, Cholesky decomposition, QR decomposition, or singular value decomposition (SVD) to calculate the filter coefficients for one out every eight subcarriers in the frequency band. In one embodiment, the network device calculates the filter coefficients for subcarriers at defined intervals such as the first subcarrier, the eighth subcarrier, the sixteenth subcarrier, the twenty-fourth subcarrier, and the like.

Once the filter coefficients for the subset of the subcarriers are calculated, the network device uses these filter coefficients to identify the filter coefficients in one or more neighboring subcarriers. For example, the coefficients for the first subcarrier are used to calculate the coefficients for the second subcarrier, the coefficients of the eighth subcarrier are used to calculate the coefficients for the seventh and ninth subcarriers, the coefficients of the sixteenth subcarrier are used to calculate the coefficients for the fifteenth and seventeenth subcarriers, and so forth. To do so, the network device uses a pseudo-inverse technique to convert the already calculated filter coefficients into filter coefficients for a neighboring subcarrier. In one embodiment, the network device performs multiple iterations of the pseudo-inverse technique to further refine the filter coefficients for the neighboring subcarrier. The network device can repeat this process for the next set of neighboring subcarriers until all the filter coefficients have been calculated. One advantage of using the pseudo-inverse technique is that unlike factorization based solvers this technique does not require reciprocals or square-roots which may reduce the time required to calculate the filter coefficients.

FIG. 1 illustrates a communication system 100 that uses MIMO communication, according to one embodiment described herein. The communication system 100 includes a central controller 150 coupled to multiple access points (APs) 105 via multiple wired backend 135 connections. The APs 105 include respective antennas 110 which facilitate wireless communication with other network devices or user devices. In one embodiment, the communication system 100 may be an enterprise level deployment where the central controller 150 is disposed in a central location in a building or campus and the wired backends 135 (optical or electrical cables) are used to couple the central controller 150 to the APs 105 which are spatially distributed in the building to provide wireless access to users in the building.

The AP 105A includes two antennas 110A and 110B, a network controller 115, a transmitter 125, and a receiver 130. Although only two antennas 110 are shown, the AP 105A may include any number of antennas for serving any number of different radios. For example, the AP 105A may include a first set of antennas with a first polarization connected to a first radio and a second set of antennas with a second, different polarization connected to a second radio. Using different polarized antennas may reduce interference when the first radio transmits data in the AP 105A and the second radio receives data, and vice versa.

In one embodiment, the transmitter 125 and receiver 130 are part of a same radio—e.g., a transceiver. As describe above, to perform MIMO, the transmitter 125 and receiver 130 use respective transmit and receive filters 120 for reducing interference from other data signals transmitted on other subcarriers. In FIG. 1, these filters 120 are stored in the controller 115. In one embodiment, the controller 115 generates the filters 120 and the filter coefficients using the techniques described herein. However, in another embodiment, a network controller on the central controller 150 calculates the filters 120 for each of the APs 105. For example, the more compute intensive tasks associated with routing data packets may be performed by the central controller 150 which may have a larger amount of compute capacity than the APs 105 which means the APs 105 can be designed to have less compute capacity, thereby reducing their cost relative to a standalone AP.

In one embodiment, the controller 115 includes hardware components such as one or more network processors and memory. Further, the controller 115 may host an operating system that executes one or more software applications. For example, the controller 115 may include a software application for generating the filter coefficients for each subcarrier in a frequency band—e.g., the 2.4 GHz or 5 GHz frequency band.

Figure 2:
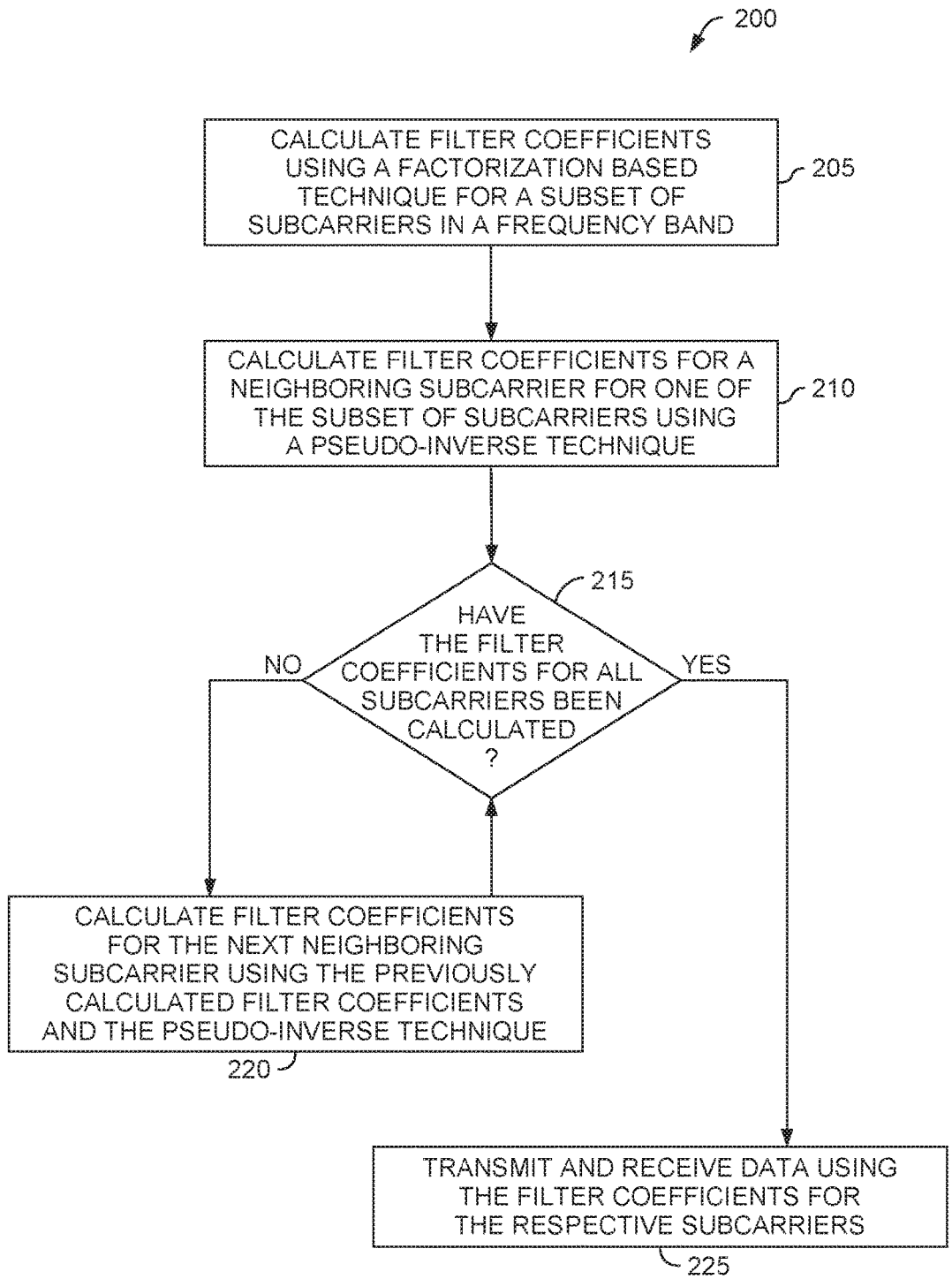
FIG. 2 is a flow chart for calculating filter coefficients for subcarriers in a frequency band, according to one embodiment described herein.

FIG. 2 is a flow chart of a method 200 for calculating filter coefficients for subcarriers in a frequency band, according to one embodiment described herein. At block 205, a controller in an AP or the central controller calculates filter coefficients using a factorization based method for a subset of subcarriers in a frequency band. Non-limiting examples of suitable factorization based methods that may be used include LDL decomposition, Cholesky decomposition, QR decomposition, or SVD. However, the embodiments herein are not limited to any particular type of factorization method. Thus, the details of these different techniques are not described in detail in this disclosure.

In one embodiment, the controller selects the subset of subcarriers using a predefined interval such that the subset of subcarriers is evenly spaced. For example, the controller may select the first subcarrier, eighth subcarrier, sixteenth subcarrier, and so forth, as the subset of subcarriers. The controller then uses the chosen factorization based method to calculate the filter coefficients for only these subcarriers.

Figure 3:
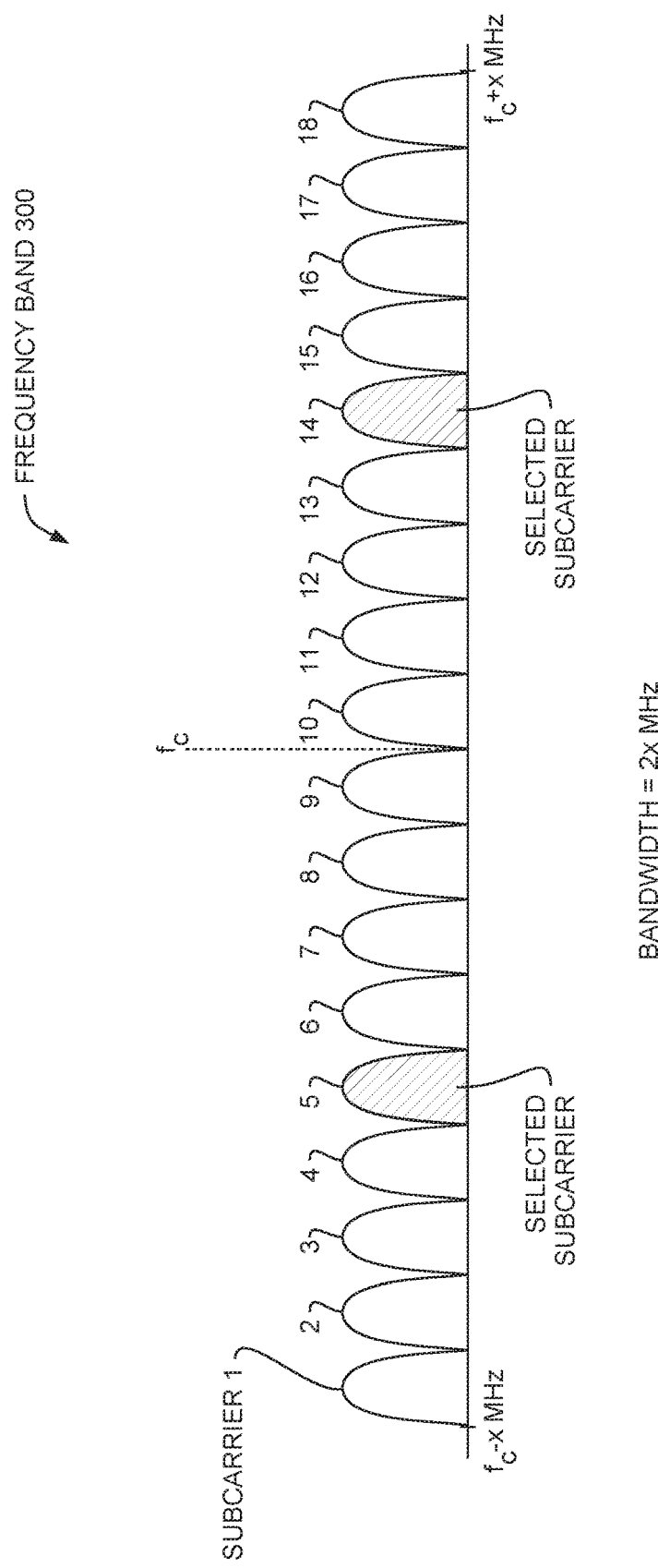
FIG. 3 illustrates subcarriers in a frequency band, according to one embodiment described herein.

FIG. 3 illustrates subcarriers in a frequency band 300, according to one embodiment described herein. The frequency band 300 can represent any range of frequencies assigned to a particular communication technique such as 802.11 (which has many different versions), LTE, and the like. As shown, the frequency band has a center frequency $f_c$ and a bandwidth of 2*X MHz where "X" varies depending on the particular communication technique employed by the access point. As shown, the range of frequencies in the frequency band 300 extends from $f_c$–X MHz to $f_c$+X MHz.

The bandwidth of the frequency band 300 is subdivided into different subcarriers—subcarriers 1-18 in this example. Thus, each subcarrier has $\frac{1}{18}$ of the bandwidth assigned to the frequency band 300. As the spacing on the subcarriers decreases, the likelihood that interference from signals transmitted on the neighboring subcarriers will affect a receiver on a different subcarrier increases.

In FIG. 3, the controller has selected two of the eighteen subcarriers to calculate the filter coefficients using a factorization based technique—i.e., subcarriers 5 and 14—as illustrated by the slanted shading. The controller has not yet calculated the filter coefficients for the remaining subcarriers.

In one embodiment, the controller determines the optimal number of subcarriers to calculate filter coefficients using the factorization technique by determining a correlation score for the subcarriers. In one embodiment, the correlation score is determined by the following equation:

$$\text{Correlation score} = \frac{\text{mean}(H_k(1,1)conj(H_k + X))}{\text{mean}(|H_k(1,1)conj(H_k + X)|)} \quad (1)$$

In equation 1, X represents the spacing between the subcarriers and k is the number of subcarriers in the frequency band. For example, a value of 8 corresponds to the scenario shown in FIG. 3 where there are 8 subcarriers between the selected subcarriers 5 and 14. The controller can vary the spacing (X) between the selected subcarriers to generate a correlation score for each of the spacing. In Equation 1, a value of 1 means the subcarriers are highly correlated while lower numbers means the subcarriers are less correlated. The controller can select the spacing by balancing the time required to calculate the filter coefficients using the factorization technique versus using the pseudo-inverse iteration technique described below. That is, decreasing the spacing means more of the filter coefficients are calculated using the factorization method (the more compute intensive method) but increasing the spacing means the subcarriers are more spread out, and thus less correlated to the selected subcarriers. As a result, it may take additional iterations of the pseudo-iteration technique in order to result in filter coefficients for the subcarrier that quickly converge to the optimal MMSE/ZF solution for each subcarrier.

The controller can use Equation 1 to identify an optimal solution that balances between the two different techniques for calculating the filter coefficients which results in using the least amount of compute resources and still results in filter coefficients with sufficient MMSE/ZF filter performance to satisfy a predefined correlation threshold. In one embodiment, to determine the spacing, the controller identifies the largest spacing (e.g., 1, 4, 8, 16, etc.) that has a correlation score greater than a threshold, e.g., more than 0.8. The controller then uses this spacing to select the subset of subcarriers to calculate filter coefficients using a factorization technique.

Returning to method 200, at block 210, the controller calculates filter coefficients for a neighboring subcarrier for one of the subset of subcarriers using the pseudo-inverse iteration technique. The pseudo-inverse iteration is described as a mathematical technique for matrix applications in "On Iterative Computation of Generalized Inverses and Associated Projections" *J. SIAM Number. Anal*. Vol. 3, No. 3, 1966 authored by Adi Ben-Israel and Dan Choen which is incorporated herein by reference. The described technique can be applied to identify the receiver filter coefficients (also referred to as an equalization matrix E) and transmit filter coefficients (also referred to as a precoding matrix P) for neighboring subcarriers. However, unlike the technique described in "On Iterative Computation of Generalized Inverses and Associated Projections", the method 200 does not start the pseudo-inverse iteration from scratch but rather uses the filter coefficients values determined at block 205 to converge on the new solution faster (i.e., filter coefficients for the neighboring subcarrier).

In the examples that follow, it is assumed the AP include four receive antennas that support two space time streams. The channel matrix H for such a system is a 4×2 matrix which includes the state information for a given channel. In one embodiment, the channel matrix H for a subcarrier is derived by transmitting known pilot signals from a transmitter to a receiver using the frequency of the subcarrier. The channel matrix H and the equalization matrix E are related by the following equation:

$$E * H = I = \begin{bmatrix} 1 & 0 \\ 0 & 1 \end{bmatrix} \quad (2)$$

In Equation 2, the equalization matrix E is a 2×4 matrix that when multiplied to the channel matrix H results in the 2×2 identity matrix I. The relationship between the equalization matrix E and the channel matrix H is further illustrated by the following:

$$E = (H'^{*}H)^{-1} * H' \quad (3)$$

$$E * H = (H'^{*}H)^{-1} * H'^{*} H \quad (4)$$

When an FFT is used to solve for the equalization matrix E, the outputs are in bit-reversed order. Using the relationships illustrated in the equations above, the values for the equalization matrix E can be calculated using the known channel matrix H for the neighboring subcarrier. For example, using the filter coefficients that were identified at block 205, the controller can use the pseudo-inverse technique to convert these filter coefficients into the filter coefficients for the neighboring subcarrier. That is, the controller uses the equalization matrix E which was calculated at block 205 to identify the values of the equalization matrix E for the neighboring subcarriers.

The pseudo-inverse technique does not rely on square-roots or reciprocals to calculate the equalization matrix E (unlike factorization based techniques) but instead uses matrix multiplications. Thus, propagating or converting the solutions identified at block 205 into solutions for the filter coefficients of a neighboring subcarrier using the pseudo-inverse technique at block 210 may require less time and less compute resources than calculating the filter coefficients using a factorization based technique.

At block 210, the controller also calculates the precoding matrix P which is used to filter transmitted signals on the subcarrier. It is again assumed the AP has four transmit antennas that support transmitting two space time streams. As such, the channel matrix H is a 4×2 matrix while the precoding matrix P is a 2×4 matrix. The relationship between the channel matrix H and the precoding matrix P is as follows:

$$P * H = I = \begin{bmatrix} 1 & 0 \\ 0 & 1 \end{bmatrix} \quad (5)$$

The relationship between the precoding matrix E and the channel matrix H is further illustrated by the following:

$$P = H'^{*}(H * H')^{-1} \quad (6)$$

$$H * P = H * H'^{*}(H * H')^{-1} \quad (7)$$

In one embodiment, the precoding matrix P is solved offline when all the channel matrixes H are available for the different channels. Unlike when solving for the equalization matrix E, here the bits may not be reversed. Using the relationships illustrated in the equations above, the values for the precoding matrix P can be calculated using the known channel matrix H for the neighboring subcarrier. One example of the pseudo-inverse technique is as follows:

$$P_{neighbor} = P_{previous} + P_{previous} * (I - H_{neighbor} * P_{previous}) \quad (8)$$

In equation 8, the $H_{neighbor}$ matrix is the channel matrix for the neighboring subcarrier. For example, using the filter coefficients $P_{previous}$ that were identified at block 205, the controller can use the pseudo-inverse iteration technique to convert these filter coefficients into the filter coefficients for the neighboring subcarrier $P_{neighbor}$. That is, the controller uses the precoding matrix P which was calculated at block 205 to identify the values of the precoding matrix P for the neighboring subcarriers. Once the equalization matrix E and the precoding matrix P are calculated for each subcarrier, these values can be used by the AP to filter received signals on the subcarriers as well as filter signals before those signals are transmitted on the subcarriers.

Moreover, the controller may perform the pseudo-inverse technique multiple times (i.e., multiple iterations) when calculating the filter coefficients for a given subcarrier. For example, the controller may repeat the pseudo-inverse technique two or three times using the results from the previous iteration in order to refine the values in the equalization matrix E and the precoding matrix P for each of the subcarriers. As described later in FIG. 5, performing multiple iterations of the pseudo-inverse technique can reduce crosstalk on a given subcarrier.

At block 215, the controller determines whether the filter coefficients for all subcarriers have been calculated. In one embodiment, the controller iterates through neighboring subcarriers until the filter coefficients for all the subcarriers have been identified. If all the filter coefficients have not been identified, method 200 proceeds to block 220 where the controller calculates filter coefficients for the next neighboring subcarriers using the previously calculated filter coefficients and the pseudo-inverse technique. For example, if at blocks 205 and 210 the controller calculated the filter coefficients for subcarrier 1 and subcarrier 2 using a factorization based technique and the pseudo-inverse technique, respectively, at block 215, the controller identifies the filter coefficients for subcarrier 3 uses the pseudo-inverse iteration technique and the filter coefficients of subcarrier 2. Method 200 then returns to block 215 to determine if there are additional filter coefficients that need to be calculated. In this manner, the controller can step through the subcarriers iteratively until all the filter coefficients have been calculated.

However, as described in more detail below, many of these calculations can be performed in parallel by the controller. For example, if at block 205 the controller calculated the filter coefficients for subcarrier 5, then at block 210 the controller can calculate the filter coefficients for subcarriers 4 and 6 in parallel using the pseudo-inverse technique and the filter coefficients identified at block 205 for subcarrier 5.

Once the filter coefficients for all the subcarriers are identified, method 200 proceeds to block 225 where the AP transmits and receives data using the filter coefficients for the respective subcarriers. That is, the values of the equalization matrix E for each subcarrier are used to filter data signals received by the AP while the values of the precoding matrix P for each subcarrier are used to filter transmitted data signals before the AP transmits the signals to other devices on one of the subcarriers. Moreover, the method 200 can be performed by (or for) each AP in a deployment to identify transmit and receiver MIMO filters that reduce crosstalk given the varying channel properties for the different APs.

Figure 4A:
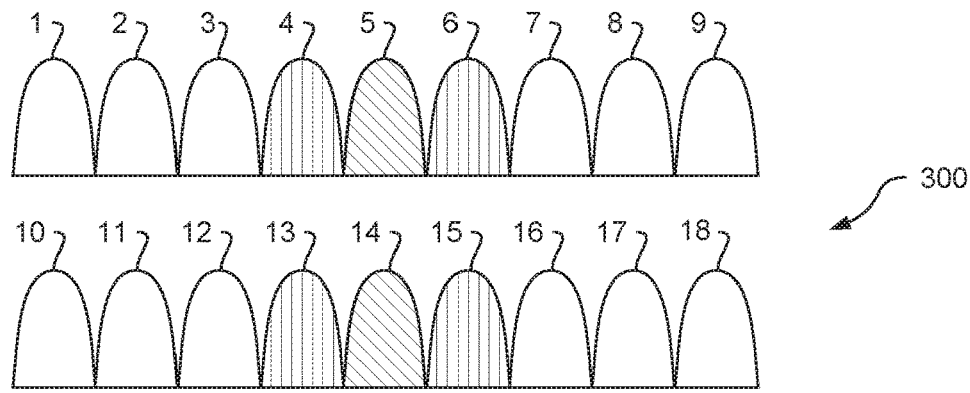
FIGS. 4A-4C illustrate sequentially calculating filter coefficients using previously calculated coefficients from neighboring subcarriers, according to one embodiment described herein.
Figure 4B:
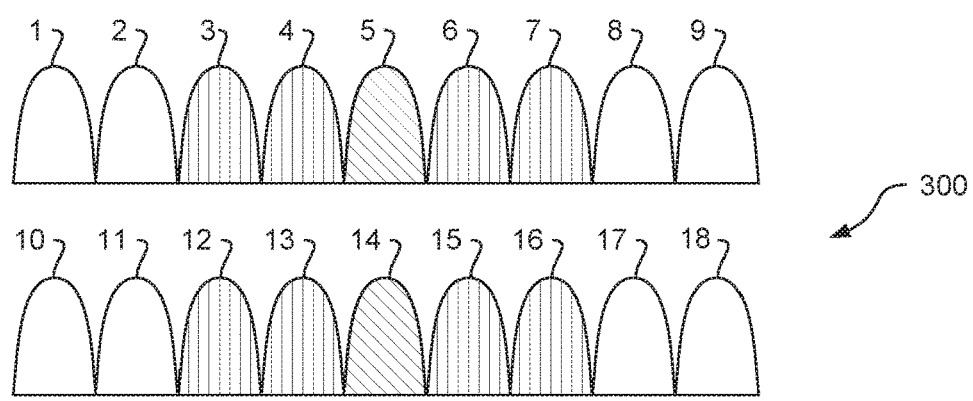
Figure 4C:
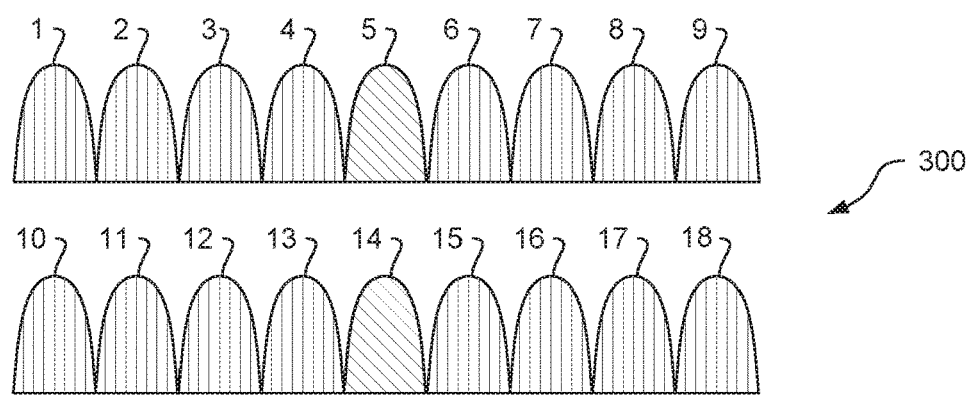

FIGS. 4A-4C illustrate sequentially calculating filter coefficients using previously calculated coefficients from neighboring subcarriers, according to one embodiment described herein. Specifically, FIG. 4A continues the example shown in FIG. 3 where a controller calculates the filter coefficients for subcarrier 5 and subcarrier 14 using a factorization based technique (e.g., block 205 of method 200). In FIG. 4A, the upper portion represents the first half of the subcarriers in the frequency band 300 (i.e., subcarriers 1-9) while the bottom portion represents the second half of the subcarriers (i.e., subcarriers 10-18). The slanted shading in subcarriers 5 and 14 illustrates that the filter coefficients were calculated using a factorization based technique.

The vertical shading in FIG. 4A illustrates that the filter coefficients for subcarriers 4, 6, 13, and 15 were calculated using the pseudo-inverse iteration technique. In one embodiment, the controller calculates the filter coefficients for subcarriers 4 and 6 using the previously calculated filter coefficients for subcarrier 5 and the filter coefficients for subcarriers 13 and 15 using the previously calculated filter coefficients for subcarrier 14 (e.g., block 210 in FIG. 2). In one embodiment, the controller calculates the filter coefficients for subcarriers 4, 6, 13, and 15 in parallel. That is, so long as the controller has sufficient compute resources, these filter coefficients can be calculated independently of one another since the values do not depend on each other but on the filter coefficients for subcarriers 5 and 14 which were previously identified. Of course, in other embodiments, the filter coefficients for subcarriers 4, 6, 13, and 15 can be calculated partially in parallel or iteratively.

FIG. 4B illustrates calculating the filter coefficients for subcarriers 3, 7, 12, and 16. The subcarriers 3, 7, 12, and 16 are shaded using vertical lines indicating the corresponding filter coefficients where calculated using pseudo-inverse iteration. For example, the controller uses the pseudo-inverse iteration to identify the filter coefficients for subcarrier 3 using the previously calculated filter coefficients for subcarrier 4, the filter coefficients for subcarrier 7 using the previously calculated filter coefficients for subcarrier 6, the filter coefficients for subcarrier 12 using the previously calculated filter coefficients for subcarrier 13, and the filter coefficients for subcarrier 16 using the previously calculated filter coefficients for subcarrier 15.

As above, the filter coefficients for subcarriers 3, 7, 12, and 16 can be calculated in parallel since these values are dependent only on filter coefficients that were previously calculated.

FIG. 4C illustrates a point of time where the controller has calculated filter coefficients for all the subcarriers in the frequency band 300. For example, after calculating the filter coefficients for subcarriers 3, 7, 12, and 16 as shown in FIG. 4B, the controller calculates the filter coefficients for subcarriers 2, 8, 11, and 17. Once those values are found, the controller can then use those coefficients to identify the filter coefficients for subcarriers 1, 9, 10, and 18.

As shown, the controller calculates the filter coefficients for all of the subcarriers except for subcarriers 5 and 14 using the pseudo-inverse technique. Doing so avoids performing a compute intensive factorization based technique for all the subcarriers. Instead, only a portion of the filter coefficients are calculated using the factorization based technique which then can be propagated using the pseudo-inverse technique to identify the remaining filter coefficients.

Moreover, method 200 illustrates calculating filter coefficients that can be used in a zero-forcing design. However, the controller can compute the block-diagonalized MU-MIMO transmit filters by performing a simple rotation on the zero-forcing solutions obtained for each of the subcarriers. This means the MU-MIMO transmit filters can be calculated without computing multiple SVDs which provides an advantage over the techniques proposed in "Zero-Forcing Methods for Downlink Spatial Multiplexing in Multiuser MIMO Channels" *IEEE Transactions on Signal Processing*, Vol. 52, No. 2, February 2004 authored by Quentin H. Spencer, A. Lee Swindlehurst, and Martin Haardt. In one embodiment, the controller can use the transmit filter coefficients identified at block 220 to generate the MU-MIMO transmit filters for the subcarriers. For example, the controller can perform a block-diagonalization instead of full-pseudo inverse computation based on the pseudo-inverse solution found at block 220 for a particular subcarrier using a QR per target group per subcarrier without using SVD. To provide an example, assume that the network device uses MU-MIMO to communicate with two different user devices—i.e., user device 1 and user device 2. Further assume that user device 1 has two receive antennas while user device 2 has only one receive antenna, and thus, the network device is transmitting data to three total receive antennas. From the pseudo-inverse solutions, the controller can determine a matrix with three columns, one column for each of the receive antennas. The controller can use the first column to send energy to the first receive antenna, the second column to send energy to the second receive antenna, and the third column to transmit energy to the third antenna. Because the first and second antennas are both on user device 1, the controller can rotate and combine the vectors in the first and second column to design a MU-MIMO transmit filter to the user device 1 without using SVD. That is, the controller can avoid the computationally expensive SVD calculation to generate the MU-MIMO transmit filter. In one embodiment, rotating the vectors in the columns is a QR rotation but can be any linear combination.

Figure 5:
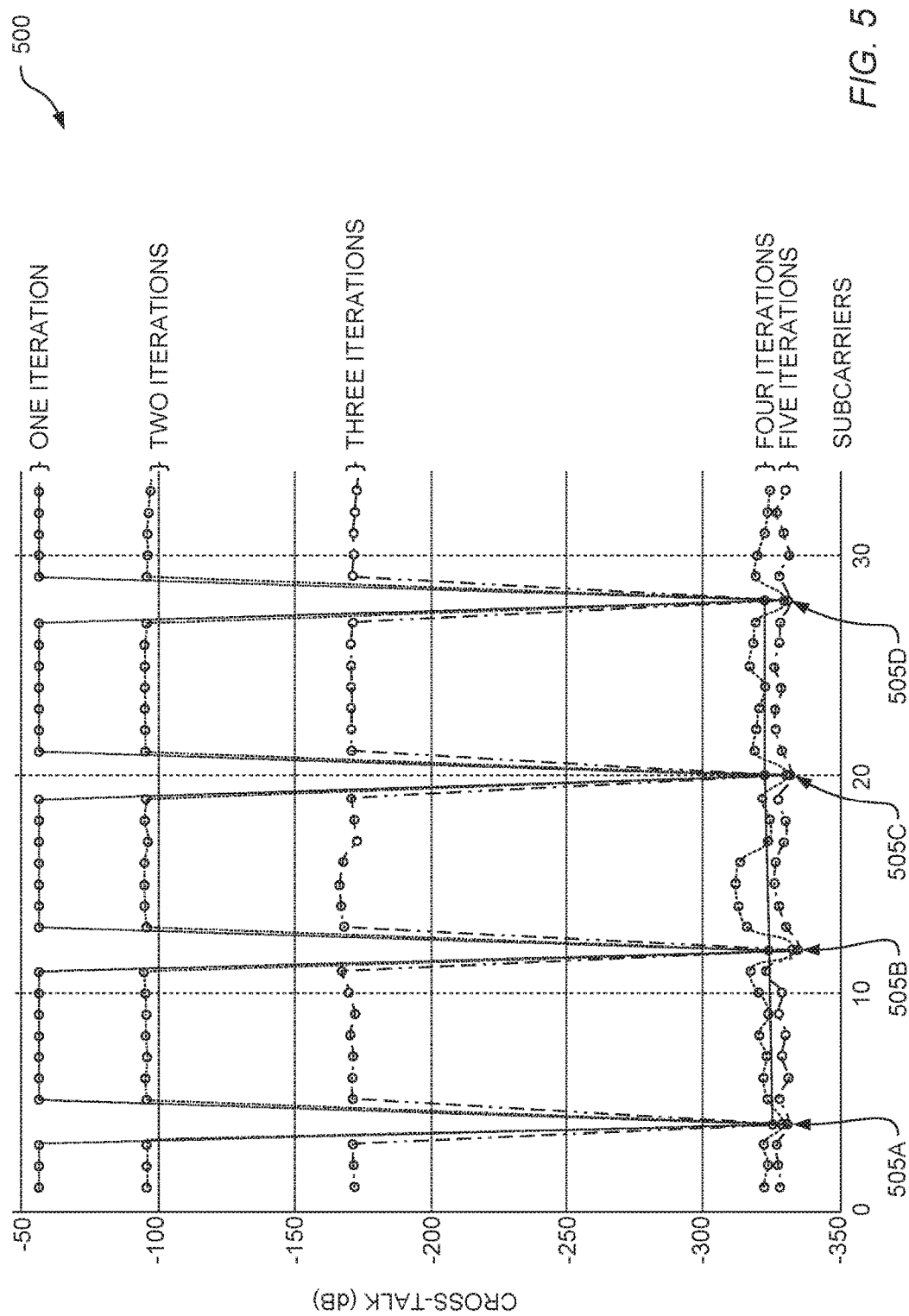
FIG. 5 illustrate simulated results of calculating filter coefficients using pseudo-inverse iteration, according to one embodiment described herein.

FIG. 5 is a chart 500 that illustrates simulated results of calculating filter coefficients using pseudo-inverse iteration, according to one embodiment described herein. The x-axis of the chart 500 lists subcarriers in a frequency band (33 in this example), while the y-axis represents the amount of crosstalk experienced by a network device when receiving signals on the subcarriers. Generally, the lower the crosstalk (i.e., the more negative dB value), the better performance.

Chart 500 includes five plots that are labeled: one iteration, two iterations, three iterations, four iterations, and five iterations. That is, each of the plots represents performing the pseudo-inverse technique using a different number of iterations—i.e., 1-5 iterations. Generally, as the iterations increase, crosstalk is attenuated (e.g., reduced). Each of the five plots has four dips 505A-D which represents subcarriers where the filter coefficients were calculated using a factorization technique rather than a pseudo-inverse technique. That is, the four dips 505A-D are subset of the subcarriers where, at block 205 of method 200, the controller calculates filter coefficients using a factorization technique. As shown, when using the filter coefficients calculated using the factorization technique to transmit and receive data on the subcarriers at the four dips 505A-D (subcarrier 4, 12, 20, and 28), the crosstalk is very low (around −325 dB).

The filter coefficients for the remaining neighbor subcarriers are calculated using one or more iterations of the pseudo-inverse technique—i.e., block 220 of method 200. For example, the filter coefficients of subcarriers 3 and 5 can be derived using the pseudo-inverse technique from the filter coefficients of subcarrier 4, the filter coefficients of subcarriers 11 and 13 can be derived from the filter coefficients of subcarrier 12, and so forth until all the remaining filter coefficients are identified. Generally, repeating the pseudo-inverse reduces the crosstalk by approximately half. That is, if the pseudo-inverse technique is performed twice when identifying the filter coefficients for the subcarriers, the crosstalk is reduced from −50 dB to −100 dB. Performing the pseudo-inverse three times for each of the neighboring subcarriers reduces the crosstalk from −100 dB to −170 dB. In one embodiment, the controller may balance between the number of iterations of the pseudo-inverse technique versus the time needed to perform each iteration since increasing the number of iterations reduces crosstalk but also increases the amount of time required to identify the filter coefficients for a particular subcarrier.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction(s) execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction(s) execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instruction(s)s may also be loaded onto a computer, other programmable data processing apparatus, or other devices to cause a series of operational blocks to be performed on the computer, other programmable apparatus or other devices to produce a computer implemented process such that the instruction(s)s which execute on the computer or other programmable apparatus provide processes for implementing the functions/acts specified in the flowchart and/or block diagram block or blocks.

The flowchart and block diagrams in the Figs. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A controller for a network device, comprising:
   a processor; and
   a memory comprising computer readable program code configured to perform an operation when executed by the processor, the operation comprising:
      determining, using a factorization based technique, first filter coefficients for a first subcarrier in a wireless frequency band; and
      determining second filter coefficients for a second subcarrier that directly neighbors the first subcarrier in the wireless frequency band based on the first filter coefficients and a pseudo-inverse technique, wherein the first and second filter coefficients are configured to filter data signals communicated with respect to the network device;
      determining third filter coefficients for a third subcarrier in the wireless frequency band based on the second filter coefficients and the pseudo-inverse technique, wherein the third subcarrier directly neighbors the second subcarrier but not the first subcarrier in the wireless frequency band; and
      filtering data signals corresponding to the first subcarrier, the second subcarrier, and the third subcarrier using the first filter coefficients, the second filter coefficients, and the third filter coefficients respectively.

2. The controller of claim 1, wherein the first and second filter coefficients are configured to be used with multiple-input and multiple-output (MIMO) communications and wherein determining the second filter coefficients comprises:
   iteratively performing the pseudo-inverse technique to refine the second filter coefficients.

3. The controller of claim 1, wherein determining the second filter coefficients for the second subcarrier and determining the third filter coefficients for the third subcarrier is performed at least partially in parallel by the controller.

4. The controller of claim 1, wherein the operation further comprises:
determining fourth filter coefficients for a fourth subcarrier in the wireless frequency band based on the third filter coefficients and the pseudo-inverse technique, wherein determining the first and third filter coefficients is performed at least partially in parallel by the controller and determining the second and fourth filter coefficients is performed at least partially in parallel by the controller.

5. The controller of claim 1, wherein the operation further comprises:
determining a multi-user multiple-input and multiple-output (MU-MIMO) transmit filter for the second subcarrier by rotating at least one vector derived from the second filter coefficients.

6. A method, comprising:
determining, using a factorization based technique performed by a network controller, first filter coefficients for a first subcarrier in a wireless frequency band;
determining, using the network controller, second filter coefficients for a second subcarrier in the wireless frequency band based on the first filter coefficients and a pseudo-inverse technique, wherein the first and second filter coefficients are used to filter data signals communicated with respect to a network device;
determining third filter coefficients for a third subcarrier in the wireless frequency band based on the second filter coefficients and the pseudo-inverse technique, wherein the first subcarrier directly neighbors the second subcarrier in the wireless frequency band, and wherein the third subcarrier directly neighbors the second subcarrier but not the first subcarrier in the wireless frequency band; and
filtering data signals corresponding to the first and second subcarriers using the first filter coefficients, the second filter coefficients, and the third filter coefficients respectively.

7. The method of claim 6, wherein the first and second filter coefficients are configured to be used with MIMO communications, wherein determining the second filter coefficients comprises:
iteratively performing the pseudo-inverse technique to refine the second filter coefficients.

8. The method of claim 6,
wherein determining the second filter coefficients for the second subcarrier and determining the third filter coefficients for the third subcarrier is performed at least partially in parallel by the network controller.

9. A network device, comprising:
a plurality of antennas coupled to a transmitter and receiver; and
a network controller configured to:
determine channel state information based on signals received by at least one of the plurality of antennas,
determine first filter coefficients for a first subcarrier in a wireless frequency band based on the channel state information,
determine second filter coefficients for a second subcarrier in the wireless frequency band based on the first filter coefficients and a pseudo-inverse technique, wherein the first and second coefficients are configured to filter data signals communicated with respect to the network device;
determine third filter coefficients for a third subcarrier in the wireless frequency band based on the second filter coefficients and the pseudo-inverse technique, wherein the first subcarrier directly neighbors the second subcarrier in the wireless frequency band, and wherein the third subcarrier directly neighbors the second subcarrier but not the first subcarrier in the wireless frequency band; and
filter data signals corresponding to the first subcarrier, the second subcarrier, and the third subcarrier using the first filter coefficients, the second filter coefficients, and the third filter coefficients respectively.

10. The network device of claim 9, wherein the first and second filter coefficients and the plurality of antennas are configured to be used with MIMO communications, wherein determining the second filter coefficients comprises iteratively performing the pseudo-inverse technique to refine the second filter coefficients.

11. The network device of claim 9,
wherein determining the second filter coefficients for the second subcarrier and determining the third filter coefficients for the third subcarrier is performed at least partially in parallel by the network controller.

12. The network device of claim 9, wherein the network controller is configured to:
determine fourth filter coefficients for a fourth subcarrier in the wireless frequency band based on the third filter coefficients and the pseudo-inverse technique, wherein determining the first and third filter coefficients is performed at least partially in parallel by the network controller and determining the second and fourth filter coefficients is performed at least partially in parallel by the network controller.

* * * * *